(No Model.) 2 Sheets—Sheet 2.

O. A. KNOX & J. FRANEY.
CARPET EXHIBITOR.

No. 534,891. Patented Feb. 26, 1895.

Witnesses
Inventors
Orrin A. Knox
John Franey
by John Wedderburn
their Attorney

UNITED STATES PATENT OFFICE.

ORRIN A. KNOX AND JOHN FRANEY, OF OMAHA, NEBRASKA.

CARPET-EXHIBITOR.

SPECIFICATION forming part of Letters Patent No. 534,891, dated February 26, 1895.

Application filed October 12, 1892. Serial No. 448,702. (No model.)

*To all whom it may concern:*

Be it known that we, ORRIN A. KNOX and JOHN FRANEY, of Omaha, in the county of Douglas and State of Nebraska, have invented certain new and useful Improvements in Carpet-Exhibitors; and we do hereby declare the following to be a full, clear, and exact description of the invention, such as will enable others skilled in the art to which it appertains to make and use the same.

Our invention relates to improvements in exhibitors, designed for its simplicity, compactness, durability and efficiency of construction and certainty and rapidity of operation.

A further object of our invention lies in the fact that it can be easily moved from place to place, also that the rolls of carpet or other material to be exhibited may be easily removed and replaced by others.

There are various forms which this device may take on, and still be within the spirit of our invention, and we do not desire to confine ourselves to the exact construction and location of parts herein shown and described.

Figure 1:
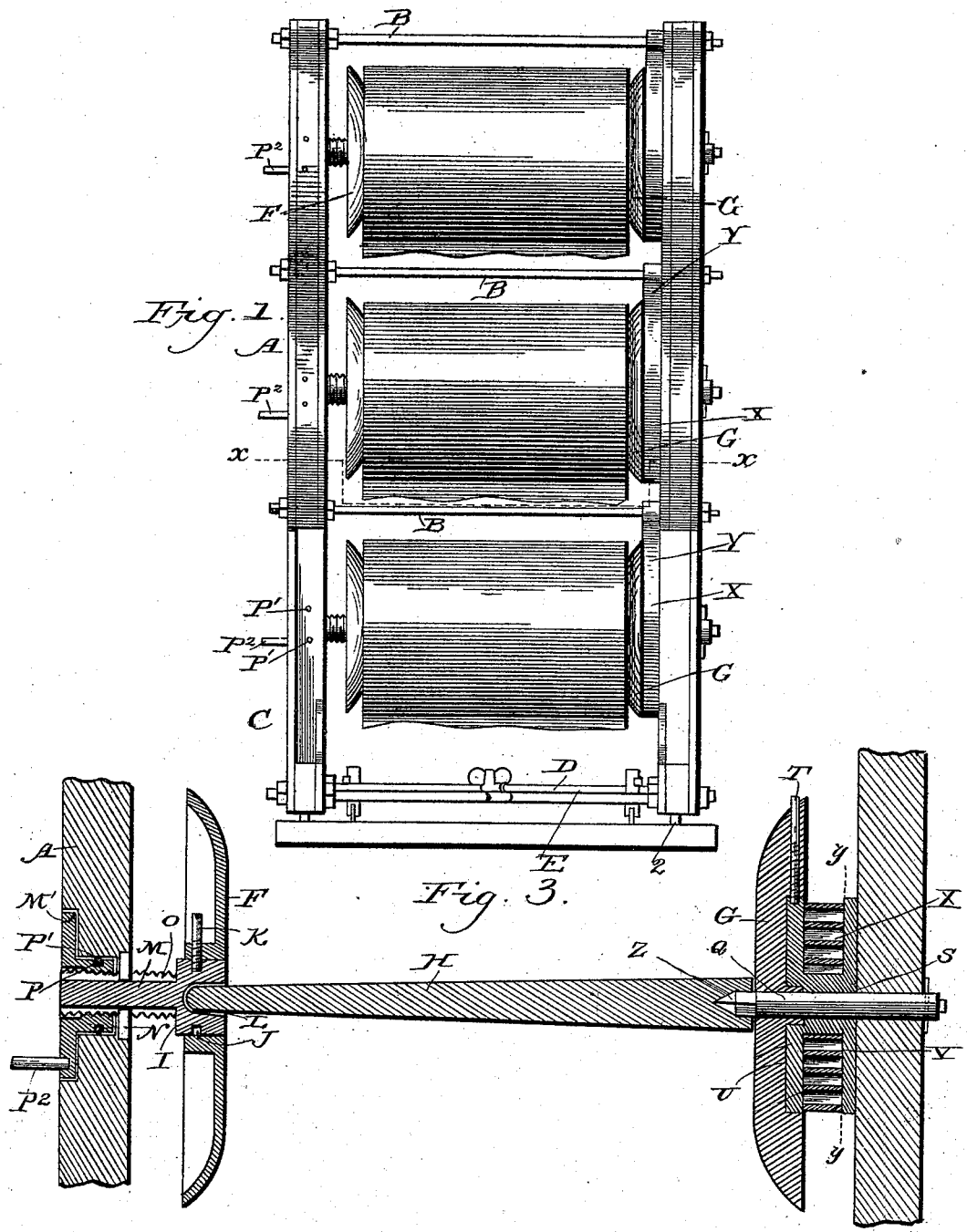
Figure 2:
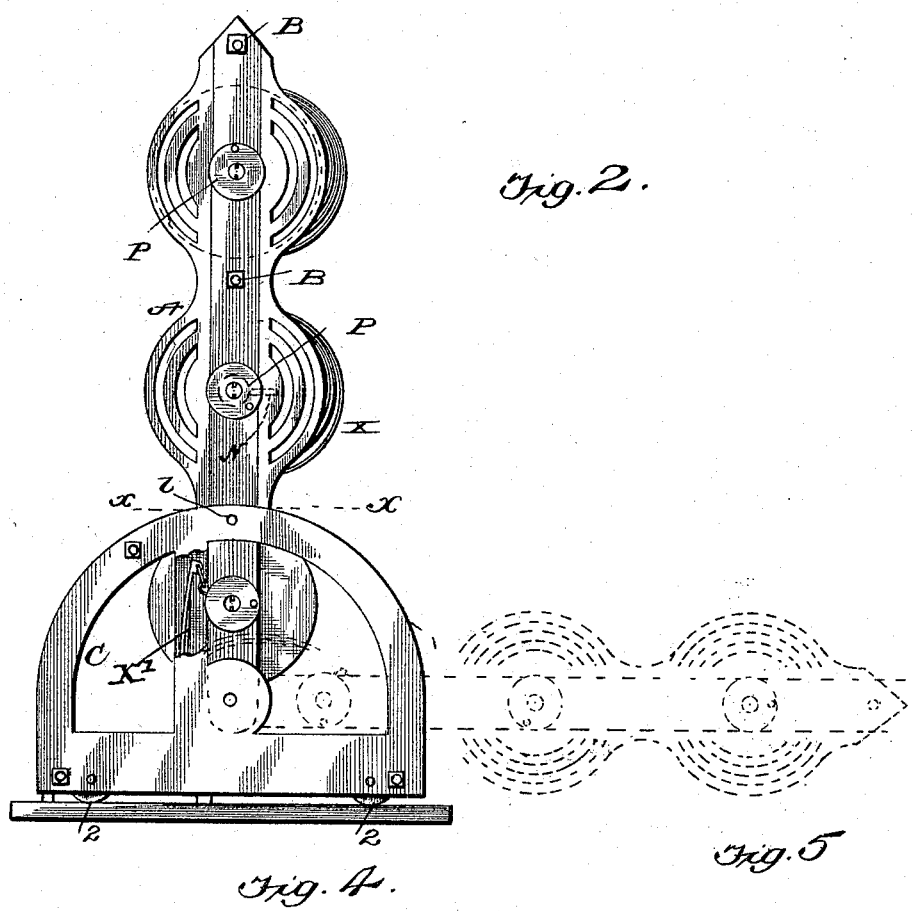
Figures 4, 5:
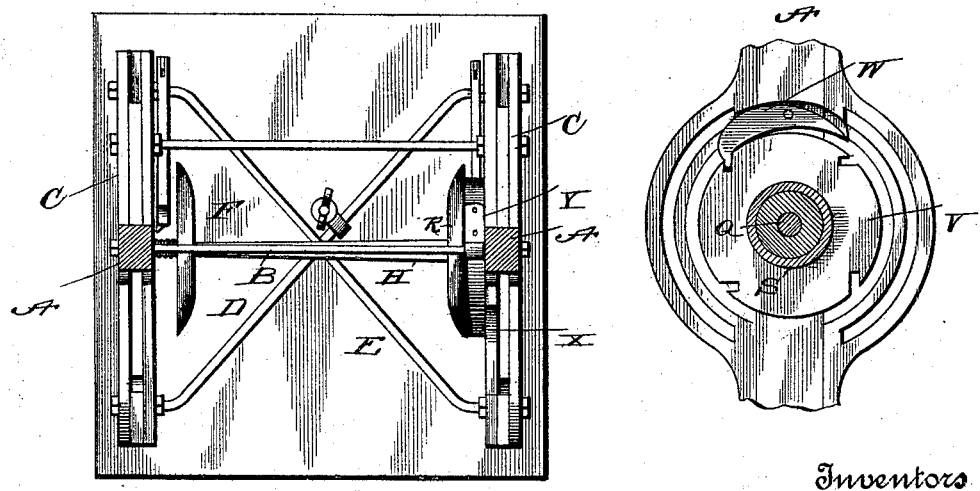

In the accompanying drawings in which similar letters and numerals of reference designate corresponding parts: Figure 1 is a front elevation of our invention. Fig. 2 is a side elevation. Fig. 3 is a section of one of the drums or rollers and connections. Fig. 4 is a plan view of the base with the portion above the line $x\ x$ Fig. 1, removed. Fig. 5 is a section through the line $y\ y$ Fig. 3, with the spring removed.

A are two parallel supports which are braced together by means of the cross rods B, and which are pivoted at their lower extremities to the frame pieces C, the latter being braced together by the rods D and E.

Between the parallel supports A and cross rods B are situated rollers or drums on which the article to be exhibited is wound.

In Fig. 3, we have shown in detail the drum and manner of connecting same with the supports A.

The drum consists essentially, of the shields or disks, F, G, which are connected by means of the bar H. Extending through the shield F is an adjustable bearing I, around which is the groove J. The shield F is revolubly secured to said bearing by means of the pin K, which rests in groove J. At one end of the bearing I is a recess L in which rests the end of rod H, while at the other end of the bearing I is a threaded stem M, which is prevented from revolving by means of the pin or key N, which rests in the groove P' formed in the said threaded stem.

Revolubly secured to the support A is sleeve P, into which the stem M passes, and by means of which the stem M and bearing I may be laterally adjusted for the purpose of accommodating the rods to the carpets or samples of varying widths.

Passing through the opposite support A is a shaft Q to one end of which is rigidly secured the shield G. On the shaft Q, between G and the support A, is situated the sleeve S, which is prevented from revolving, independent of said shaft, by means of pin T, which rests in a notch in the flange U. At the other end of sleeve S is a flange V, the circumference of which is notched as shown in Fig. 5, said notches being adapted to receive the pawl W; the portion of the flange on each side of said notches being of unequal heights, so that when the shaft Q and sleeve S are revolved rapidly, the pawl W remains clear of the notches, but when the sleeve is revolved more slowly, the pawl will fall into one of said notches, and thereby prevent the shaft and drum from revolving.

One end of a spring X is rigidly secured to the sleeve S, while its other end is secured to a piece Y, which is in turn loosely secured to the cross rod B.

At one end of the rod H is a rectangular recess Z, into which rests a corresponding projection on the shaft Q, thereby imparting the revolution of said shield to said rod, or vice versa.

The supports A are secured in an upright position in relation to the lower frame pieces C, by means of pins (1), which pass through both the frame C and supports A.

When it is desired to remove the rolls of the article being exhibited, the pins (1) are removed and the supports A are lowered into the position shown in dotted lines in Fig. 2.

In order to counterbalance the weight of the supports A, while they are being lowered, it is our intention to have springs $x'$ $x'$ situated at the point of junction between the frame C and supports A.

In order to facilitate the moving of the frame from one position to another, we have supplied the frame C with the rollers (2).

The manner of unrolling and exhibiting the article on the drums, is exactly the same as that employed in lowering and raising an ordinary spring curtain, the spring X being intended to wind up the article after being exhibited and the pawl W is adapted to retain and prevent the drum from revolving after the required amount of the carpet or other article has been unwound.

The end of the shaft Q is so arranged that a crank or handle can be readily attached in case the spring needs winding up.

The construction and arrangement of the several parts of our exhibitor being thus made known, the operation and the advantages of the same will, it is thought, be readily understood.

Having thus fully described our invention, what we claim, and desire to secure by Letters Patent, is—

1. In an article of the class described, the combination with parallel supports A, a series of rollers or reels having bearings in said supports, said reels being composed of a central bar H, one end of which rests in a bearing I, said bearing I having a threaded stem M, sleeve P on said stem, a shield F, revolubly secured to said bearing I, a shield at the other end of said rod H, said shield being rigidly secured to axle Q, on which is secured sleeve S, a spring X secured to said sleeve, and a pawl W engaging notches on said sleeve, substantially as and for the purpose set forth.

2. In a carpet exhibitor, the combination of supports and a roll mounted between said supports and comprising two end shields, one of which has a spring shaft passing therethrough and the other provided with an adjustable bearing having a recess in one end, and a rod H having one end fitted in said recess, and the other end thereof formed with a rectangular recess, to receive the inner end of the shaft, substantially as described.

In testimony whereof we have signed this specification in the presence of two subscribing witnesses.

ORRIN A. KNOX.
JOHN FRANEY.

Witnesses:
GEO. J. PAUL,
JOS. P. WAGNER.